United States Patent [19]
Guillermier et al.

[11] Patent Number: 5,516,401
[45] Date of Patent: May 14, 1996

[54] PROCESS FOR ELECTROCHEMICAL MACHINING

[75] Inventors: Pierre Guillermier, Lyon; Alain Blocquel, Dardilly, both of France

[73] Assignee: Framatome, Courbevoie, France

[21] Appl. No.: 271,470

[22] Filed: Jul. 7, 1994

[30] Foreign Application Priority Data

Jul. 8, 1993 [FR] France .................................. 93 08433

[51] Int. Cl.$^6$ .............................. B23H 3/08; B23H 3/10; B23H 9/00
[52] U.S. Cl. .......................... 205/653; 205/671; 205/685
[58] Field of Search .......................... 204/129.75, 224 M, 204/272, 141.5, 129.7, 129.5

[56] References Cited

U.S. PATENT DOCUMENTS

| | | | |
|---|---|---|---|
| 4,369,101 | 1/1983 | Wolff et al. | 204/272 X |
| 4,826,582 | 5/1989 | Lavalerie et al. | 204/272 X |
| 4,849,084 | 7/1989 | Vouzelland | 204/272 X |

FOREIGN PATENT DOCUMENTS

| | | |
|---|---|---|
| 352594 | 7/1989 | European Pat. Off. . |
| 2232197 | 7/1971 | Germany . |

OTHER PUBLICATIONS

Search Report FR 93 08433 Mar. 1994.
Derwent Publications Ltd. AN 91–345095 no Date.
Derwent Publications Ltd. AN 87–21166 no date.
Derwent Publications Ltd. AN 87–038273 no date.

*Primary Examiner*—Donald R. Valentine
*Attorney, Agent, or Firm*—Pollock, Vande Sande & Priddy

[57] ABSTRACT

An electrolyte is circulated between the surface to be machined, raised to an anode potential, and a tool electrode (9') raised to a cathode potential. The electrolyte contains lithium nitrate as a unique active product with a concentration of between 20 g/l and 2350 g/l and preferably between 50 g/l and 250 g/l. The process can be applied to the machining of the surface of any metallic component and in particular to the machining of the internal surface of tubular components (5) such as penetrations in the vessel bottom or closure head of a nuclear reactor; in this case the electrochemical machining cell consists of a cylindrical tool electrode (9') placed inside the component to be machined.

5 Claims, 2 Drawing Sheets

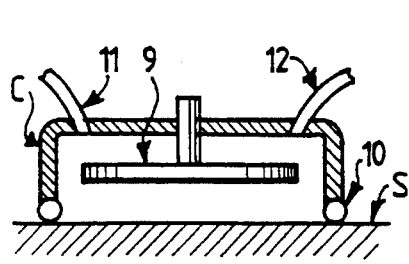
FIG. 2
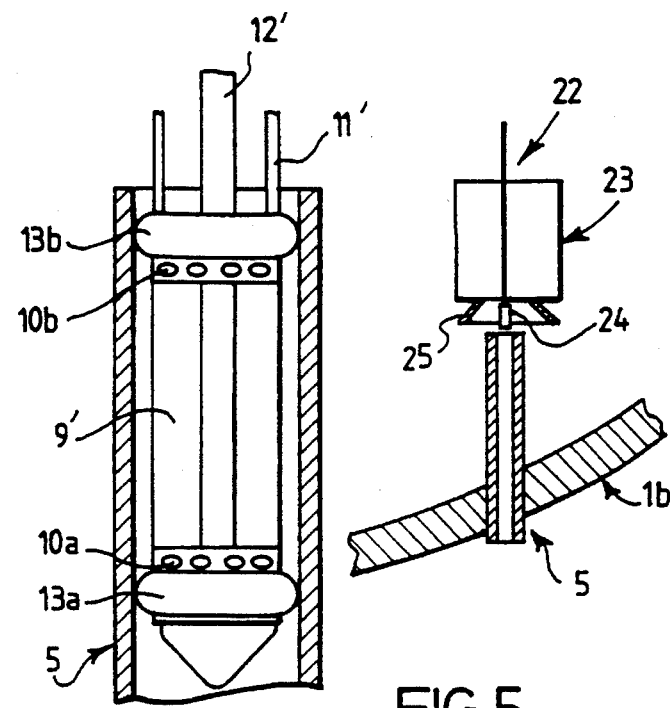
FIG. 3
FIG. 5
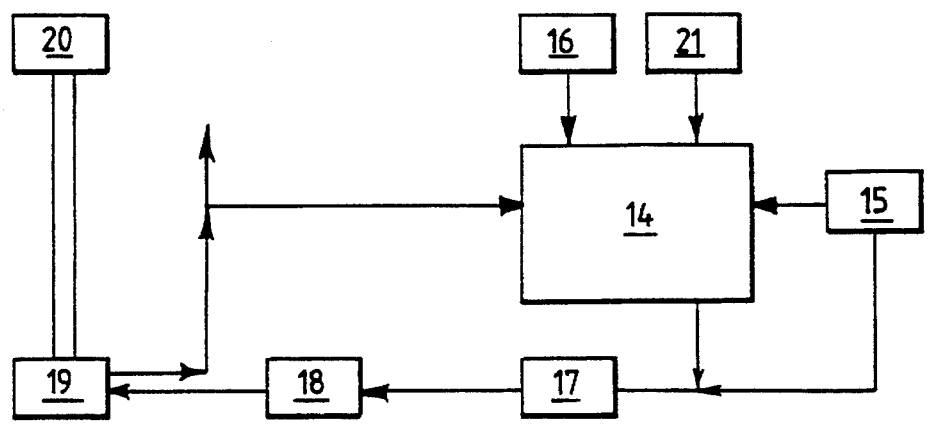
FIG. 4

PROCESS FOR ELECTROCHEMICAL MACHINING

FIELD OF THE INVENTION

The invention relates to a process for electrochemical machining with removal of substance of metallic materials belonging especially to the group including nickel alloys and stainless steels and in particular of the cylindrical inner surface of a tubular component, for example of the interior surface of a bottom penetration of a vessel or of a penetration adapter of the closure head of a nuclear reactor.

BACKGROUND OF THE INVENTION

Pressurized water nuclear reactors generally comprise a vessel containing the reactor core which is immersed in the pressurized water for cooling the reactor. The reactor vessel, of cylindrical overall shape, comprises a closure head of hemispherical shape, which can be fitted onto its upper part.

The curved bottom of the vessel is pierced with openings, at each of which a tubular penetration component is secured by welding.

These vessel bottom penetrations comprise an end projecting under the curved bottom, which is connected to a flexible measurement conduit enabling the bottom of the vessel to be connected to an instrumentation room arranged in the structure of the reactor building. Each of the measurement conduits and the corresponding vessel bottom penetration provide passage for a thimble in which a measuring probe travels, secured to the end of a flexible component of great length, and its entry inside the vessel and the core to perform measurements, for example measurements of neutron flux or of temperature, inside the core, while the reactor is operating.

In order to increase the reliability and the operational safety of nuclear reactors and to prolong their useful life, the users are obliged to carry out increasingly numerous checks on the various constituent components of the nuclear reactor and, if appropriate, repairs of defects which may have been detected.

In particular, it may be necessary to check the state of the penetration components of the vessel bottom (and of the vessel closure head penetrations) to ensure that these components are undamaged after a certain period of operation of the reactor, in particular in the region where these penetration components are welded to the bottom of the vessel.

In the event that defects have been detected in the inner surface of a penetration component, these defects, must be repaired, for example by depositing a layer of a metal such as nickel on the inner surface of the penetration component, in the region exhibiting the defects, or else by carrying out an excavation to a certain depth, by machining with removal of matter, of the region exhibiting defects.

The repair operations on the vessel bottom penetration pipes of a nuclear reactor must be performed during a shutdown of the nuclear reactor. The vessel closure head is removed and the operation is carried out through the inside of the bore of the penetration component and by remote control, since the components are situated at the bottom of the vessel and are highly irradiated.

A process and a device have therfore been employed for carrying out simply, rapidly and under complete control, with an excellent surface quality, the excavation of the surface exhibiting defects, i.e. the removal of the material from the component to a limited and perfectly controlled depth so as to generate a new surface which is free from defects.

To this end, applicants' FR-A-92-09,789 discloses a process for machining the cylindrical inner surface of a tubular component such as an adapter secured to the closure head of the vessel of a pressurized water nuclear reactor, by erosion under the effect of a high velocity liquid jet optionally containing a pulverulent abrasive substance.

This process can be employed in particular for carrying out repairs or preventive treatments on the inner surface of an adapter. It results in an improvement of the surface quality, but this machining process is tricky to use and does not make it easily possible to implement accurate control of the thickness of the material which has been removed.

Electrochemical machining was developed above all in the field of aeronautics in the years 1958 to 1965 in the United States and in Europe, as a result of the use in this field of materials which are difficult to machine by conventional machining processes, such as nickel- or cobalt-based refractory metals or alloys or titanium alloys.

At the present time, this process is employed in aeronautics especially for machining vanes; the motor industry employs it for etching stamping dies and components of various types such as big ends, stub axle bearings and rocker arms, manufactured on a large scale in specific shapes and materials.

The electrolytes most commonly employed for machining the majority of metals and alloys, including refractory steels and alloys based on nickel or cobalt, are aqueous solutions of sodium nitrate or sodium chloride.

Other electrolytes, such as acidic or basic (NaOH, $NH_4$, $NH_4NO_3$) solutions are needed for machining some metals and alloys which cannot be dissolved in sodium nitrate or chloride.

In SU-A-1633308 and SU-A-1255325, it has been proposed to use complex mixtures containing in particular sodium nitrate, lithium chloride and copper sulfate or lithium hydroxide and sodium bichromate.

A large number of machining speed curves and of polarization curves have been plotted and published.

However, electrochemical machining processes employing sodium-based electrolytes are generally detrimental to the metal structure.

In fact, sodium in the form of an alkaline compound is one of the potential main causes of caustic corrosion of the intergranular type in nickel-based alloys.

In addition, these processes are low in efficiency and do not allow a material to be machined to an appreciable depth in a sufficiently short time.

SUMMARY OF THE INVENTION

The objective of the invention is therefore to propose a process for electrochemical machining with removal of substance of metallic materials belonging especially to the group including nickel alloys and stainless steels, consisting in circulating an electrolyte in contact with the surface to be machined, in raising the surface to an anode potential, placing a tool electrode raised to a cathode potential in the vicinity of the component and in passing a current between the tool electrode and the component to be machined, a process which does not damage the metallic structure of the component, which is faster than known electrochemical machining processes, efficient, accurate, and which makes it possible to produce excellent surface quality.

To this end, the electrolyte used contains lithium nitrate ($LiNO_3$) as a unique active component.

In general, the concentration of lithium nitrate in the electrolyte is between 20 g/l and 2350 g/l and the density of the current passing through the electrolyte is between 2 $A/cm^2$ and 4000 $A/cm^2$, and preferably:

the concentration of lithium nitrate in the electrolyte is between 50 g/l and 250 g/l and the density of the current passing through the electrolyte is between 5 $A/cm^2$ and 50 $A/cm^2$.

The process according to the invention comprises stages of treatment of the effluents and of the means for circulating the fluids. It can be applied to the electrochemical machining of the cylindrical inner surface of a tubular component such as a vessel bottom penetration of a pressurized water nuclear reactor, or an adapter passing through the closure head of the vessel. The electrolyte is circulated in a leakproof space of annular shape, situated between the tool cathode of cylindrical shape and the inner surface of the component to be machined.

BRIEF DESCRIPTION OF THE DRAWINGS

In order that the invention will be more clearly understood a description will now be given, by way of example, with reference to the attached drawings of an embodiment of a process according to the invention.

FIG. 2 is a sectional view of the electrolysis cell in the case of the machining of a planar surface.

FIG. 3 is a view in axial section of a tubular component such as a vessel bottom penetration or an adapter passing through the vessel closure head and of an electrolysis cell according to the invention.

FIG. 4 is a flow diagram of the machining loop according to the invention.

FIG. 5 is a sectional view of a vessel bottom penetration fitted with a remotely controlled docking device.

DETAILED DESCRIPTION

Figure 1:
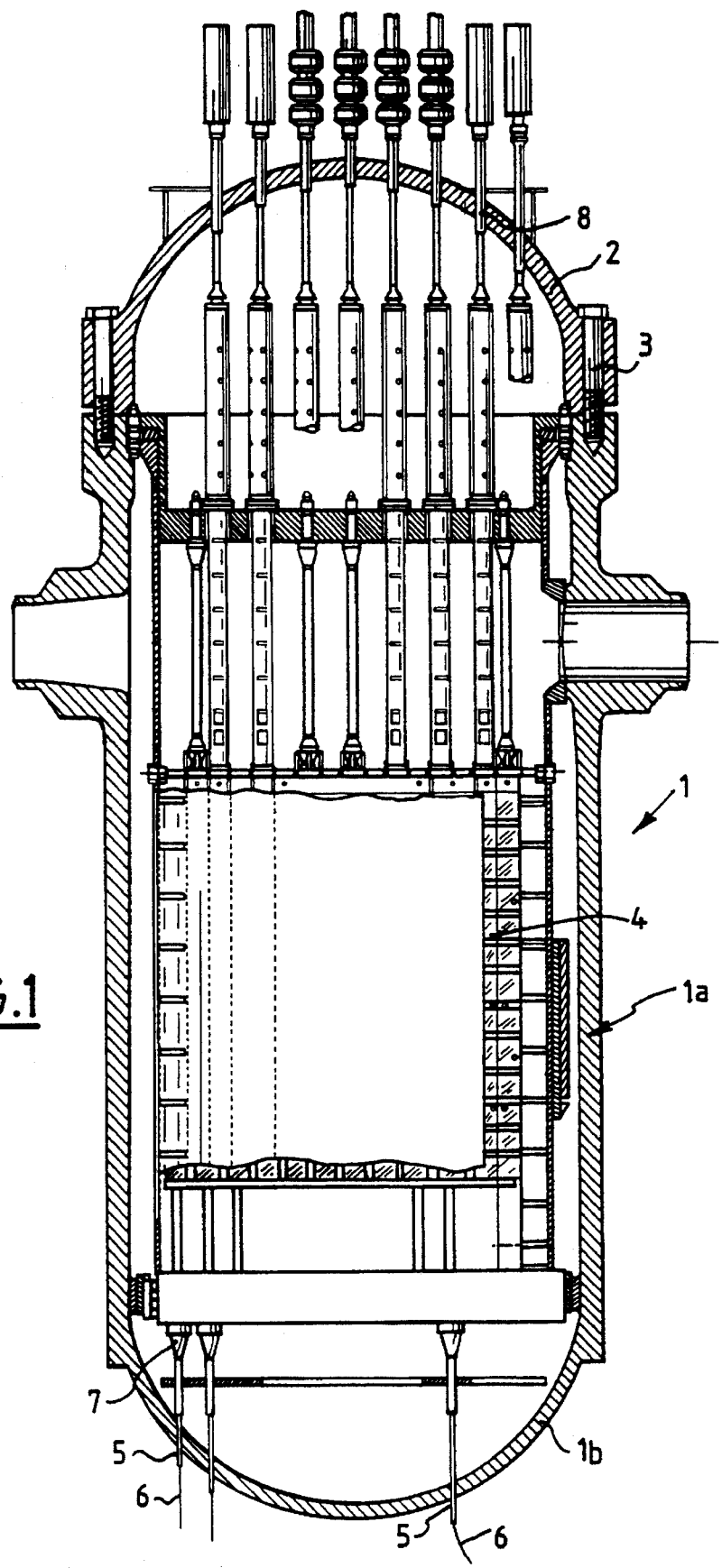
FIG. 1 is a schematic view in section through a vertical plane of the vessel of a pressurized water nuclear reactor.

FIG. 1 shows the vessel of a nuclear reactor 1.

The vessel comprises an outer enclosure of substantially cylindrical shape, closed at its lower end by a substantially hemispherical curved bottom 1b.

The upper end of the enclosure 1a of the vessel 1 can be closed by a substantially hemispherical closure head 2 which rests on a supporting bearing in the upper part of the enclosure 1a and which is secured in a leakproof manner onto the enclosure 1a by clamping studs 3. The vessel 1 contains the core 4 of the nuclear reactor, consisting of fuel assemblies of prismatic shape which are arranged in an adjoining manner.

Passing through the vessel bottom 1b are vessel bottom penetrations 5 of tubular shape, which comprise lower ends projecting outside the curved bottom 1b, each connected to an instrumentation guide conduit 6.

Above and inside the curved bottom 1b, each of the vessel bottom penetrations 5 comprises a projecting upper end which is introduced inside an instrumentation guide column 7.

The guide conduits 6, the vessel bottom penetrations 5 and the columns 7 make it possible to provide passage for thimbles containing measuring probes, between the nuclear reactor instrumentation room and the core 4 arranged inside the vessel.

Passing through the closure head 2 are adaptors 8 providing passage for the reactor control rod followers.

In the region where the penetration components 5 are welded to the bottom of the vessel, the stress conditions are such that the inside of the tubes is subjected to high corrosion. These defects must then be repaired by treating the inner surface of the tubes.

The machining according to the invention of a planar component will first of all be described generally.

In FIG. 2 the surface to be machined S is planar. An electrode 9 is brought to a cathode potential in a space determined by a bell C and leakproofed by a seal 10. The electrolyte is conveyed by a conduit 11 and leaves by a conduit 12. The current travels through the electrolyte and gives rise to the anodic reaction of dissolving on the surface S with formation of hydroxide precipitates. The bell can next be moved over the metallic surface in order to machine another region.

FIG. 3 shows an electrolysis cell suitable for the electrochemical machining treatment of a tubular component, for example a vessel bottom penetration or an adapter passing through the closure head of the vessel, in which damage has been detected.

This machining cell consists of flexible conduits, one 11' providing the supply of electrolyte solution to one of the distributors 10a, 10b, the other (in the middle) 12' ensuring the return of the electrolyte carrying away the hydroxide precipitates and the heat produced by the reaction.

A hollow tool metal electrode 9' raised to a cathode potential, of cylindrical shape, is situated inside the component to be machined, raised to an anode potential, thus determining a volume of annular shape between the anode and cathode. At the lower end and at the upper end of this electrode there are, respectively, an inner distributor 10 and an upper distributor 10b, in the form of transverse plates pierced with radial channels, ensuring, in the case of the distributor 10b, the delivery of the electrolyte or of a rinsing product into the anode-cathode volume, and, in the case of 10a, the return of these fluids. These distributors 10a and 10b are connected to the conduits 11' and 12'.

Radially expandable lower seal 13a and upper seal 13b, of toric shape, situated below the lower distributor 10a and above the upper distributor 10b respectively, make it possible to isolate the region to be treated and to work in air or under water. The radial expansion of the seals is produced by pulling the inner part in relation to the outer part of the machining cell, by means of a jack.

The volume between the anode and cathode is therefore perfectly isolated from the remainder of the tube.

The current then travels through the electrolyte, allowing the anodic dissolution of the inner surface of the tubular component, resulting in the formation of precipitates of insoluble hydroxides.

The electrolyte used for this anodic dissolution contains lithium nitrate as a unique active component in particular the electrolyte does not contain sodium ions $Na^+$ and chloride ions $Cl^-$.

The advantages of this electrolyte are decisive. Lithium in the form of an alkaline compound is much less detrimental to the metallurgical structure of the component than sodium in the form of an alkaline compound. In fact, lithium hydroxide (LiOH), a strong base, has relatively limited solubility: it precipitates in the event of saturation. The risks of excessive local concentrations of LiOH giving rise to corrosion are therefore limited.

Nitric acid ($HNO_3$), a strong oxidizing acid, is known as a steel passivator.

As a result, the electrolyte ($Li^+$, $NO_3^-$) is characterized by its harmlessness to the machined metal.

The equivalent limiting conductivities of the ions making up the electrolyte ($Li^+$, $NO_3^-$) make it possible to obtain a conductivity which is high and stable over a wide pH range, and therefore to machine at high current densities.

The rate of dissolution (or rate of machining) of the surface to be treated depends on the current density which is applied. The electrolyte used therefore makes it possible to obtain high rates of machining.

The machining as performed thus makes it possible rapidly to obtain an excellent surface quality and does not modify the metallurgical structure of the component.

The machining process employed in the machining cell described above generates solid waste consisting of hydroxide sludge in the electrolyte solution. The machining loop produced according to the invention makes it easier to treat the effluents and to remove these insoluble hydroxides by filtration.

The components of the machining loop are shown in FIG. 4.

The machining cell described above is shown at 19; the said cell is fed with current by the generator 20. The operations which will be described below succeed each other in the loop. The electrolyte solution containing lithium nitrate is prepared in the vessel 14 by injecting water and reactants originating from the vessels 16 and 15 respectively.

The electrolyte solution is circulated in the loop, for example by a pump 17.

The solution is filtered from its hydroxide precipitates, for example by filters 18.

The filters 18 become loaded with metal hydroxides; after pressing of these filters, approximately six grams of hydroxide sludge are recovered per gram of metal dissolved. The filtered electrolyte returns to the circulation loop.

During machining, the pH of the electrolyte solution varies, and the pH of the said solution can be adjusted by injecting a pH control agent (for example nitric acid), for example by means of the vessel 21.

At the end of machining, the components 17, 18, 19 and the machined component are rinsed in vessel 15.

During electrolytic machining a considerable release of hydrogen is produced. It is advisable to extract this gas from the vessel 14 by means of a pipework to convey it towards the power station purification circuit, with a view to subsequent discharge into the open air. In fact, hydrogen is undesirable in a nuclear power station because of explosion risks.

This electrochemical machining can be applied to the vessel bottom penetrations and to the penetrations in the vessel closure head. The device shown in FIG. 5 can be employed for installing the electrochemical machining cell inside these tubes.

The tooling needed for access to the vessel bottom penetrations is shown in FIG. 5. The procedure is the same as in the case of television inspections of the vessel bottom penetrations.

First of all, a part of the internal equipment is removed.

The rod 22 makes it possible to move up and down, to allow the cell 24 to enter and travel inside the vessel bottom penetration 5.

The docking tooling, remotely controlled from servicing platform, is contained in the device 23, and the cone 25 makes docking and centring possible.

The service tooling is the same in the case of the vessel closure head adapters, from which the thermal sleeve has previously been withdrawn.

The process according to the invention makes it possible to obtain high rates of machining and high accuracy of machining, as illustrated by the example described below.

An NC15Fe grade alloy was machined by electrochemical machining as described generally with reference to FIGS. 1 and 3.

The machining modifying the internal diameter of a cylinder from 50 mm to 17 mm at a current density of 12 $A/cm^2$ was carried out with a rate of machining of the order of 10 $cm^3$/min with a solution which had a lithium nitrate concentration of 100 g/l.

The process according to the invention applies not only to the machining of a defective surface layer inside an adapter passing through the bottom or the closure head of the vessel of a nuclear reactor, but also to the machining of the inner surface of tubular metallic components of any type to generate a new surface which has defined geometrical and physical characteristics, and to the machining of components of other shapes.

This machining can be carried out solely in the region of isolated defects such as cracks, before refilling of the cracked metal with sound metal, or along the whole surface of the component.

Machining according to the process of the invention can be performed on a surface of a component before it is subjected to a treatment of pressurizing or of stress relieving by hammering, or of electroplating.

The process can be applied to components which are planar or of complex shapes on any electrically conductive metallic material.

We claim:

1. Process for electrochemical machining with removal of substance of a piece made of metallic materials, said process comprising the steps of:

(a) circulating an electrolyte in contact with a surface of a piece to be machined, said electrolyte containing lithium nitrate as a sole active component;

(b) raising said surface to an anode potential;

(c) placing a tool electrode raised to a cathode potential in a vicinity of said surface such that a space is maintained between said surface and said tool electrode:

(d) passing a current between said tool electrode and said surface, for machining said surface; and (e) rinsing said space between said surface and said tool electrode as well as said surface by circulating a rinsing liquid in said space after machining said surface.

2. Process according to claim 1, wherein said piece to be machined is a cylindrical inner surface of a tubular piece of a pressurized water nuclear reactor and wherein said electrolyte is circulated in a leakproof space of annular shape located between said tool electrode of cylindrical shape and said inner surface of said tubular piece.

3. Process according to claim 1, wherein the concentration of lithium nitrate in the electrolyte is between 20 g/l and 2350 g/l, and the density of the current passing through the electrolyte is between 2 A/cm$^2$ and 4000 A/cm$^2$.

4. Process according to claim 3, wherein the concentration of lithium nitrate in said electrolyte is between 50 g/l and 250 g/l, and the density of the current passing through the electrolyte is between 5 A/cm$^2$ and 50 A/cm$^2$.

5. Process according to claim 1, wherein:

said electrolyte is prepared in a vessel by injecting water and reactants;

(b) the electrolyte solution is circulated in a circulation loop; the solution is filtered from its hydroxide precipitates;

(d) the filtered electrolyte is returned into the loop; and (e) the pH of the solution is adjusted by injecting a pH control agent.

* * * * *